Dec. 12, 1967  D. M. LIPPI  3,357,540
FEED MOVING APPARATUS
Filed April 22, 1966  3 Sheets-Sheet 1
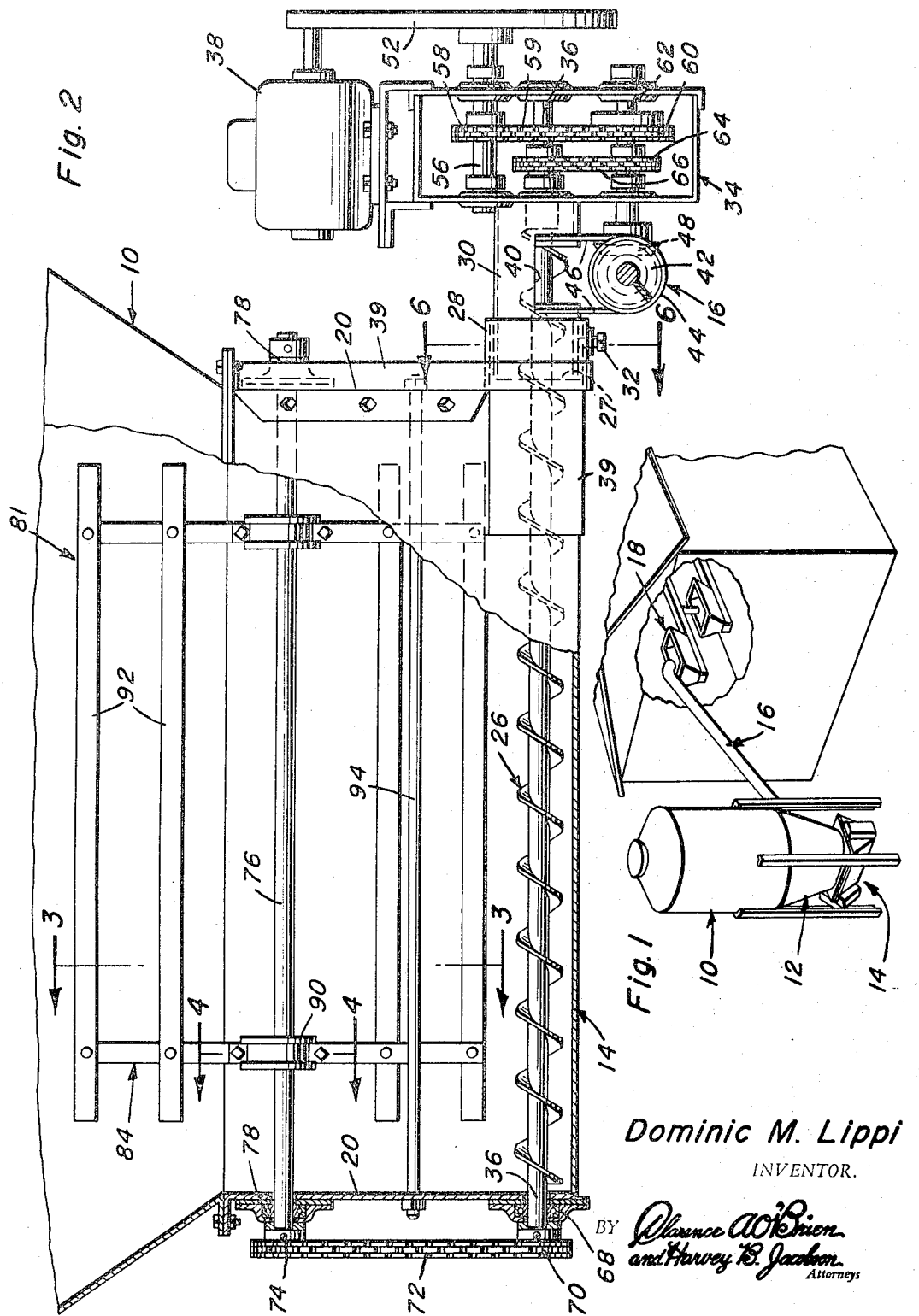
Dominic M. Lippi
INVENTOR.
BY Clarence A. O'Brien
and Harvey B. Jacobson
Attorneys Dec. 12, 1967 — D. M. LIPPI — 3,357,540
FEED MOVING APPARATUS
Filed April 22, 1966 — 3 Sheets-Sheet 2

Dominic M. Lippi
INVENTOR.

BY Clarence A. O'Brien
and Harvey B. Jacobson
Attorneys

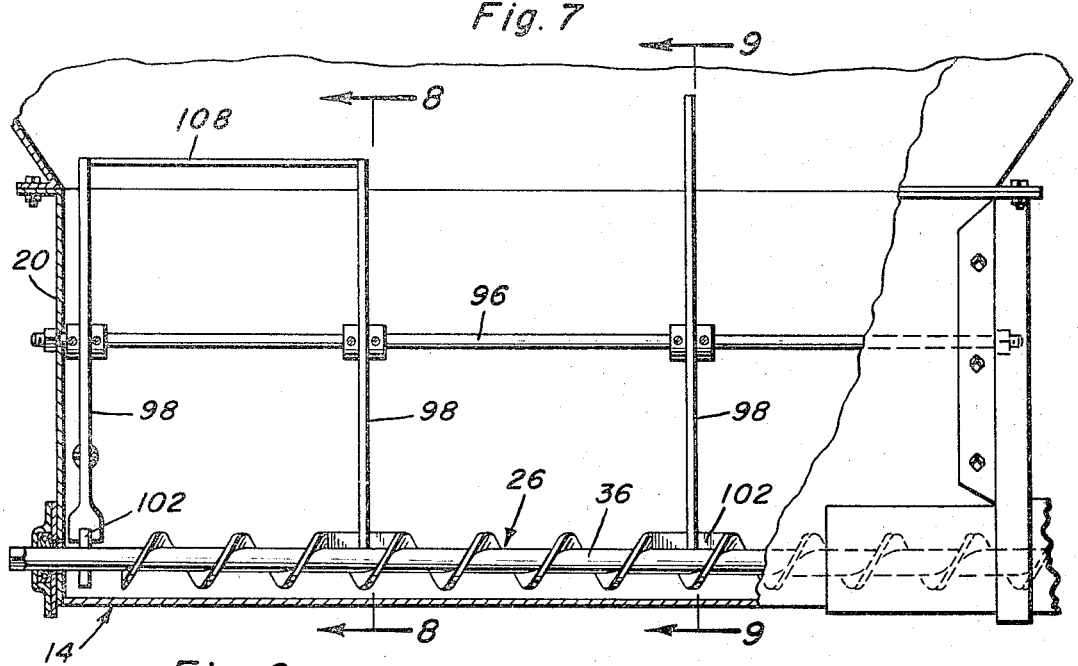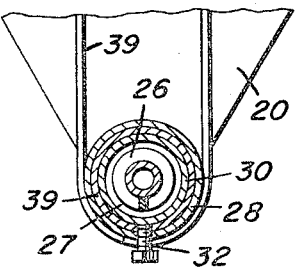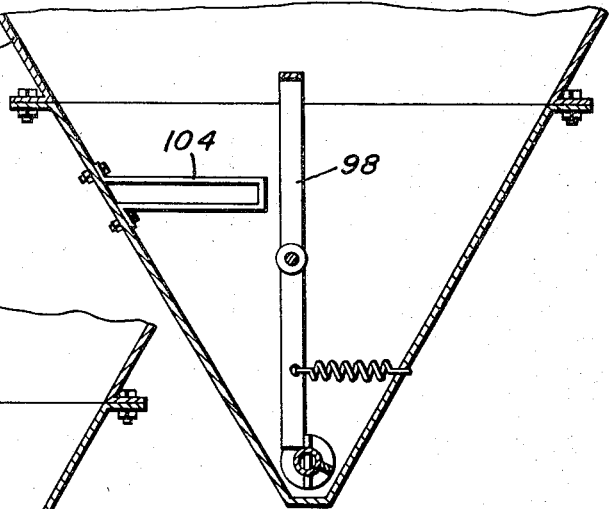

3,357,540
FEED MOVING APPARATUS
Dominic M. Lippi, % A. R. Wood Manufacturing Co.,
Luverne, Minn. 56156
Filed Apr. 22, 1966, Ser. No. 544,580
14 Claims. (Cl. 198—64)

ABSTRACT OF THE DISCLOSURE

A feed receiving hopper having an elongated feed moving auger in the bottom thereof which extends beyond one end of the hopper and communicates with a second vertically adjustable feed moving auger. An agitating means is located within the hopper above the first auger and is reciprocally movable in response to a movement of the two augers so as to agitate the feed and maintain a smooth flow of the feed to the first auger.

---

The instant invention is generally concerned with feed moving apparatus, and more particularly with apparatus for unloading feed from a bulk storage bin and conveying the feed to feed distribution means.

It is a primary object of the present invention to provide apparatus which will remove feed from a bulk storage bin effectively and consistently, avoiding the intermittent flow normally associated with conventional feed moving apparatus and arising from a tendency of the feed to bridge or jam within the throat of the bin.

In conjunction with the above object, it is a significant object of the invention to utilize elongated feed conveying augers to both move the feed from the bulk bin and outwardly direct the feed, at an adjustable vertical angle, to a suitable distribution point.

Another sgnificant feature of the instant invention is to provide means whereby a constant agitation of the feed within the bulk bin is effected during the feed moving operation with this agitation assuring a constant flow of feed to the grain moving augers.

In addition, it is a significant object of the instant invention to provide feed moving apparatus wherein the two feed moving augers and the feed agitating means associated therewith are driven from a common power source.

Further, it is an important object of the instant invention to provide feed moving apparatus wherein an angular adjustment of the auger utilized in moving the feed to the distribution point is possible so as to accommodate the apparatus to various different feeding installations.

Basically, the above objects are achieved through the utilization of an apparatus which includes a collection hopper mounted on the lower end of a bulk bin in feed receiving relationship thereto, a feed receiving and moving auger extending along the bottom of the hopper, agitator means positioned above the auger and projecting into the lower end of the bulk bin, means engaged between the auger and the agitator for effecting an agitating movement of the agitator in response to a feed moving rotation of the auger, and a second feed moving auger located outward of the hopper and in communication with the discharge end of the first auger for the reception of feed therefrom for movement to an ultimate distribution point, the second auger being angularly adjustable in a vertical plane relative to the first auger for accommodating various height feed distribution systems.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view generally indicating the feed moving system of the instant invention;

FIGURE 2 is an enlarged elevational view, partially in cross-section, illustrating the feed moving apparatus;

FIGURE 6 is a partial cross-sectional view taken substantially upon the plane passing along the line 6—6 in FIGURE 2;

FIGURE 7 is a view generally similar to FIGURE 2 illustrating modified forms of agitating means;

FIGURE 8 is a cross-sectional view taken substantially upon the line 8—8 in FIGURE 7; and FIGURE 9 is a cross-sectional view taken substantially along the line 9—9 in FIGURE 7.

Figure 5:
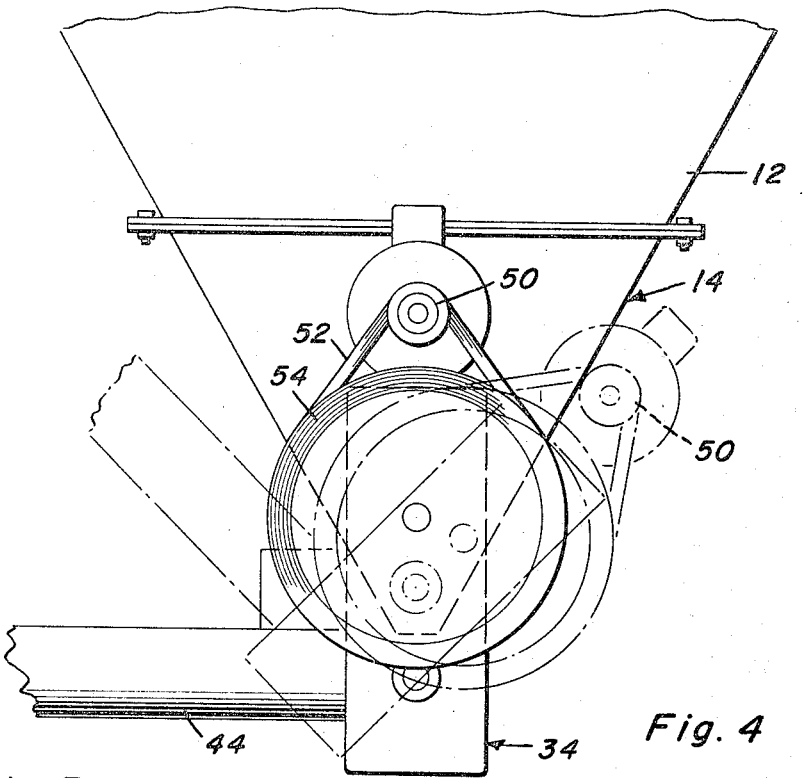
FIGURE 5 is an enlarged view of the right end of the structure of FIGURE 2.

Referring now more specifically to the drawings, it will be noted that FIGURE 1 illustrates a feed moving system including a bulk storage bin 10 having gradually sloping walls about the lower or throat portion 12 thereof, a feed receiving hopper 14 communicated with the lower end of the bin 10 for the reception of feed therefrom, and an elongated feed conveying member 16 extending from feed receiving communication with the hopper 14 to the final feed distribution unit or system 18.

Figure 3:
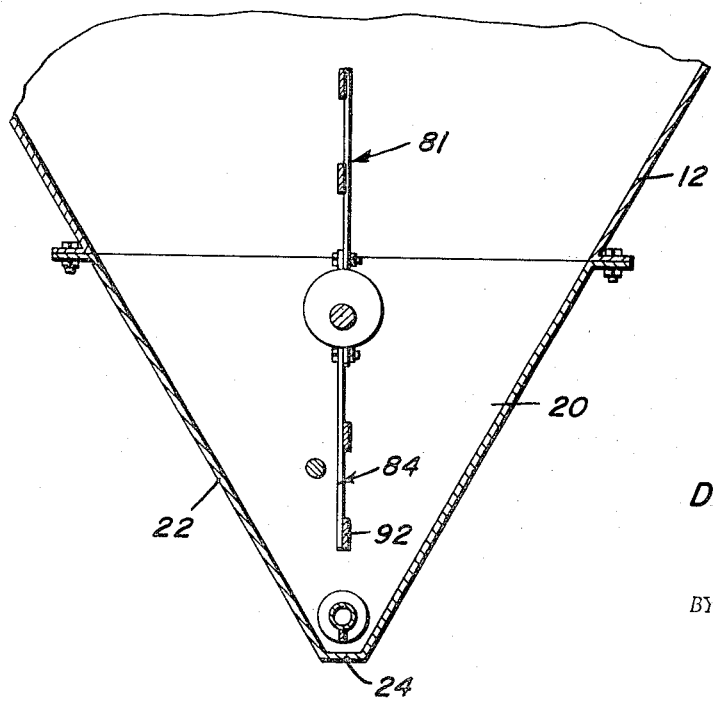
FIGURE 3 is a cross-sectional view taken substantially on the plane passing along the line 3—3 in FIGURE 2.
Figure 4:
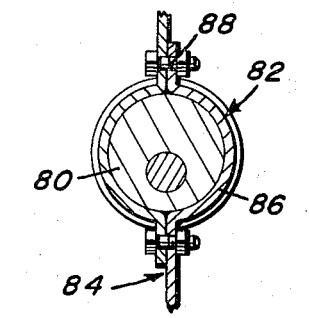
FIGURE 4 is an enlarged cross-sectional view taken substantially upon a plane passing along the line 4—4 in FIGURE 2.

With reference to FIGURES 2, 3, and 5, it will be noted that the hopper 14 comprises, in addition to opposed flat end walls 20, a pair of downwardly converging flat side walls 22 terminating in a narrow flat bottom 24. In this manner, all of the feed received from the bulk bin 10 will be funneled downwardly toward the relatively narrow bottom of the hopper 14. Positioned within the narrow lower portion of the hopper 14 is an elongated feeding auger 26 which, upon a rotational driving thereof, engages the feed and directs it laterally through a suitable discharge port 27 within one of the end walls 20. This feed discharge port 27 is surrounded by an enlarged outwardly projecting collar 28 fixed to the hopper 14, the collar 28 telescopically and rotatably receiving a cylindrical sieeve 30 with the sleeve being releasably locked within the collar by a suitable setscrew or bolt 32. The sleeve 30, as will be appreciated from FIGURE 2, projects outwardly from the hopper 14 with the auger 26 extending centrally therethrough. Mounted on the fixed to the outer end of the sleeve 30 is a gear reduction unit 34 which in turn receives the projecting end of the auger shaft 36 for effecting a rotational driving thereof in response to the introduction of a drive force from a suitable power source such as a motor 38, also supported on the sleeve 30 and preferably mounted on the housing of the unit 34. Incidently, suitable reinforcing plates or the like 39 can be utilized in rigidifying the adjoining end of the hopper so as to better support the load introduced thereinto by the sleeve and the elements mounted on the sleeve.

It will be noted that the lower end of the feed conveying means 16, which consists basically of a second elongated conveying auger 42 received within an elongated cylindrical conveying tube 44, is also mounted on the sleeve 30 and projects laterally thereof between the gear reduction unit 34 and the collar 28. An enlarged port 40 is provided within the sleeve 30 below the discharging end of the auger 26 whereby the feed moved by the auger 26 will discharge through the port 40 into the conveying tube 44. Further, opposed side walls 46 are provided between the conveying tube 44 and the sleeve 30, at the opposite sides of the feed discharge opening 40, with these side walls 46 acting so as to confine and direct the feed, and also constituting the means for mounting the lower end of the tube 44 on the sleeve 30. The driving of the auger 42 will also be effected from the gear reduction unit 34 by means of miter gears 48.

Inasmuch as the bulk bin 10 will normally be set up before the balance of the feeding operation, it is important that the angle of inclination of the conveying means 16 be adjustable. This adjustment is provided for by means of the rotational reception of the sleeve 30 within the collar 28, which enables a rotational adjustment of the inclined conveying means 16 to the desired angle prior to a locking of the sleeve 30 within the collar 28 through suitable locking means such as setscrew 32. This adjustment, inasmuch as both the motor 38, and drive assembly 34 are mounted on the sleeve 30, is effected without necessitating any dismantling or realignment of equipment, and while still maintaining positive driving connection with both augers 26 and 42. FIGURE 5 is of interest in illustrating two adjusted positions of the equipment.

Insofar as the drive chain is concerned, it will be noted that the motor drive pulley 50 drives, through an endless belt 52 and an enlarged pulley 54, a first shaft 56 of the reduction unit 34. A sprocket 58 on the shaft 56 drives, through a chain 59, a second sprocket 60 on the shaft 62 which in turn mounts one of the miter gears 48 by which the auger 42 is controlled. In addition, the shaft 62 mounts a sprocket 64 which, through a suitable endless chain 66, drives the shaft 36 of the auger 26.

With continuing reference to FIGURE 2, it will be noted that the remote end of the shaft 36 of the auger 26 projects through a suitable bearing support 68 on the far end wall 20 and mounts, on this projecting end, a sprocket or gear 70. This shaft mounted sprocket 70 is drivingly engaged, through an endless chain 72, with a second sprocket or gear 74 mounted on the projecting end of an agitator shaft 76, the end portions of which are suitably supported, for rotation, within bearing units 78 mounted on the opposed end walls 20. This agitator shaft 76 is located through the upper portion of the hopper 14 immediately below the lower end of the bin 10.

Fixed to the shaft 76, and rotatable therewith, are a pair of circular eccentrics or eccentric disks 80 which mount an agitator frame or rack 81. These disks 80 are rotatably received within central bearing collars 82 of vertical straps 84 of the rack 81, with each bearing strap 84 being formed of upper and lower portions having opposed semicircular inner ends 86 which in turn cooperate so as to define the bearing collar. Suitable bolts 88 are utilized so as to releasably interlock the collar defining portions 86 about the corresponding eccentric 80 in an obvious manner. Further, in order to retain each of the strap collars 82 on its corresponding rotatably received eccentric 80, flat side plates 90 will be affixed to the opposite sides of each eccentric 80. The agitator rack or frame 81 is completed by the provision of a pair of horizontally extending flat straps or bars 92 between both the aligned upper portions of the vertical straps 84 and the aligned lower portions thereof. With this construction, it will be appreciated that as the agitator shaft 76 rotates in response to a rotation of the feed auger 26 a slight up and down as well as lateral movement of the agitating frame 81 will be produced. It has been proven that this slight movement is in fact sufficient so as to prevent a bridging of the feed above the auger 26, as well as within the throat 12 of the bin 10, in a manner which produces a constant smooth flow of feed from the bin. Incidentally, a suitable limit rod 94 will also normally be provided so as to maintain a substantially vertical positioning of the agitator frame 81 during the movement thereof, this rod 94 extending longitudinally through the hopper 14 and being fixed to the opposed end walls 20 thereof at a height generally centrally between the auger 26 and agitator shaft 76.

Referring now specifically to FIGURES 7, 8 and 9, attention is directed to the fact that the instant invention also contemplates providing agitators activated by direct engagement with the auger 26 rather than through the sprocket chain drive illustrated in FIGURE 2. The directly driven agitator incorporates an elongated mounting shaft 96 fixed to the opposed end walls 20 at approximately mid height within the hopper 42. Rotatably mounted on the shaft 96 is one or more vertically orientated agitator bars 98. These bars 98 are maintained substantially vertical by means of expansible resilient springs 100, each bar having one of such springs 100 engaged between the lower portion thereof and one of the sloping hopper side walls 22. Each of the bars 98 is activated so as to produce the desired agitation by being periodically engaged at the lower end thereof by a rib or projection 102 fixed to the auger shaft 36 in alignment with the corresponding bar 98. This engagement causes a swinging of the bar 98 in a manner so as to resiliently expand the spring 100 which, upon a passing of the projection 102, returns the bar 98, thus producing a reciprocating movement thereof. This projection 102 may be in the form of an elongated plate as illustrated in conjunction with the two right hand bars of FIGURE 7, or one or more projecting pins engageable with an enlarged or panel-like lower end of a corresponding bar 98 as illustrated in conjunction with the left hand bar of FIGURE 7. If so desired, more than one projection 102 can be provided for sequential engagement with a particular bar 98, depending upon the degree of agitation desired, however, one such projection will normally be sufficient.

It is contemplated that the agitation effected by the bars 98 be of two types. One such type, noting FIGURE 8, involves the production of agitation, to a substantial degree, solely by the movement of the bar 98 within the feed. A suitable stop 104 is fixed to the opposite side wall 22 from that which is engaged by the spring 100, with this stop being spaced a sufficient distance from the upper portion of the corresponding bar 98 so as to allow for a substantial amount of return movement of the bar while also absorbing a small amount of the force of the moving bar 98 so as to produce a slight thumping or vibration within the hopper itself, the main agitation of course being effected by the movement of the bar 98 through the feed. This particular arrangement has been found especially useful with those feeds including a substantial degree of molasses or fats.

The form of agitator illustrated in FIGURE 9 differs from that of FIGURE 8 in that the stop 106 is positioned directly against the upper portion of the vertically orientated bar 98 whereby a substantial thumping or engagement of the bar 98 against the stop 106 results with this in turn producing a corresponding substantial vibration of the hopper itself. Such a thumping agitation has also been found particularly effective as a means for preventing a bridging of the feed both within the bin throat and above the auger 26.

On occassion, it may be considered desirable to include a horizontal bar or strap 108 between the upper ends of a pair of adjacent vertical bars 98 as illustrated in FIGURE 7. Further, it should be appreciated that any number of bars 98 can be incorporated into a single bin 14, depending upon the nature of the particular feed involved. These bars 98 can of course be utilized in effecting the straight movement type agitation of FIGURE 8 or the vibration type of agitation of FIGURE 9, or for that matter, both types in combination.

From the foregoing, it will be appreciaed that a unique feed moving apparatus has been defined, this apparatus including means for ensuring a proper and continuous flow of feed from a bulk storage bin to a final distribution system. Of particular significance is the fact that the feed moving apparatus incorporates agitator means in conjunction with and directly controlled by the initial feed receiving and moving auger, with this agitating means eliminating any tendency for the feed to bridge over the auger this being an extremely troublesome problem in the more conventional moving equipment. In addition, it is considered significant that the apparatus incorporate adjustable means for directing the feed from the bulk bin to the final distribution system so as to accommodate variations in height of different distribution systems, since such systems will normally be constructed subsequent to the installation of the bulk bin. Finally, as will be appreciated by a review of the foregoing, the entire apparatus requires only a single motor with this motor, as well as the drive train associated therein, being mounted in a manner so as to maintain driving engagement with all of the elements of the apparatus throughout the full range of adjustment thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Feed moving apparatus comprising a feed receiving hopper, feed moving means located in the lower portion of said hopper, said means extending through and beyond said hopper for discharging feed therefrom, agitator means mounted within said hopper over said moving means, means for effecting a selective activation of said feed moving means, means operatively engaging said agitator means with said feed moving means for effecting an activation of said agitator means in response to an activation of said feed moving means, said agitator means including a shaft mounted on the opposed end walls of the hopper and spanning said hopper above and generally parallel to said feed moving means, and at least one vertical member on said shaft and rotatably mounted thereby for movement in response to a movement of the feed moving means, said vertical member projecting into close proximity to said feed moving means, said means operatively engaging said agitator means with said feed moving means for effecting an activation of said agitator means comprising striker means on said moving means for periodically engaging said vertical member upon a movement of the moving means so as to produce a rotational movement of the vertical member transversely of the feed moving means within the hopper.

2. The apparatus of claim 1 including spring means resiliently resisting the rotational movement of said vertical member and forcibly returning said vertical member upon a disengagement of the striker means.

3. The apparatus of claim 2 including rigid stop means fixed to the hopper wall within the path of return movement of said rotatably moving vertical member so as to abruptly halt the return movement of said vertical member and produce a resultant vibration of the hopper.

4. The apparatus of claim 3 wherein said rigid stop is located so as to stop the returning vertical member upon a return of the vertical member to its vertical position.

5. The apparatus of claim 1 wherein said vertical member also projects upwardly from said shaft to a point above the upper extremity of said hopper.

6. The apparatus of claim 2 wherein said vertical member also projects upwardly from said shaft to a point above the upper extremity of said hopper, said spring means being engaged between said vertical member and said hopper below said shaft.

7. The apparatus of claim 1 including a plurality of vertical members rotatably mounted by said shaft, and an elongated bar interconnecting the upper extremities of said vertical members in spaced parallel relation to said shaft.

8. The apparatus of claim 1 wherein said feed moving means comprises an elongated auger including a longitudinally extending auger shaft, said striker means being affixed to said shaft and projecting radially therefrom in rotational alignment with the adjacent lower end of said vertical member for engagement therewith upon a rotation of said auger shaft.

9. Feed moving apparatus comprising a feed receiving hopper, feed moving means located in the lower portion of said hopper, said means extending through and beyond said hopper for discharging feed therefrom, agitator means mounted within said hopper over said moving means, means for effecting a selective activation of said feed moving means, means operatively engaging said agitator means with said feed moving means for effecting an activation of said agitator means in response to an activation of said feed moving means, second feed moving means having one end in feed receiving communication with the first mentioned moving means outward of said hopper, and means mounting said second moving means for angular adjustment relative to said first moving means while retaining communication with said first moving means, said means mounting said second moving means including a cylindrical sleeve rotatably received over the portion of the first moving means outward of said hopper, said sleeve constituting a continuation of the lower portion of the hopper, a collar rigidly fixed to the hopper and slidably receiving the sleeve, and means on said collar for fixing said sleeve in any of a plurality of rotationally adjusted positions, said agitator means including a shaft mounted on the opposed end walls of the hopper and spanning said hopper above and generally parallel to said first feed moving means, at least one vertical member on said shaft and rotatably mounted thereby for movement, said vertical member projecting into close proximity to said first feed moving means, said means for operatively engaging said agitator means with said first feed moving means comprising striker means on said first moving means for periodically engaging said vertical member upon a movement of the first moving means so as to produce a rotational movement of the vertical member transversely of the first feed moving means within the hopper.

10. The apparatus of claim 9 wherein said sleeve includes a lateral discharge port in the lower portion thereof, the second moving means having a feed receiving end portion thereof directly underlying the discharge port for enabling a gravity transfer of feed thereto.

11. The apparatus of claim 9 including spring means resiliently resisting the rotational movement of said vertical member and forcibly returning said vertical member upon a disengagement of the striker means.

12. The apparatus of claim 11 including rigid stop means fixed to the hopper wall within the path of return movement of said rotatably moving vertical member so as to abruptly halt the return movement of said vertical member and produce a resultant vibration of the hopper.

13. The apparatus of claim 12 wherein said rigid stop is located so as to stop the returning vertical member upon a return of the vertical member to its vertical position.

14. The apparatus of claim 12 wherein said rigid stop is located so as to be engaged by the returning vertical member upon a returning movement of the vertical member beyond its vertical position.

References Cited
UNITED STATES PATENTS

| | | | |
|---|---|---|---|
| 796,477 | 8/1905 | Wallace | 198—99 |
| 1,783,092 | 11/1930 | Lewis | 198—64 |
| 2,005,681 | 6/1935 | Norquist | 198—64 |
| 2,998,152 | 8/1961 | Wognum et al. | 198—64 |
| 3,081,862 | 3/1963 | Knoedler | 198—233 |
| 3,133,727 | 5/1964 | Luscombe | 198—213 |
| 3,193,083 | 7/1965 | Crane | 198—64 |

HUGO O. SCHULZ, *Primary Examiner.*

EVON C. BLUNK, *Examiner.*

R. I. HICKEY, *Assistant Examiner.*